United States Patent [19]

Kubo

[11] Patent Number: 4,964,651
[45] Date of Patent: Oct. 23, 1990

[54] SUSPENSION FOR MOTOR VEHICLES

[75] Inventor: Kanji Kubo, Tochigi, Japan

[73] Assignee: Honda Giken Kogyo Kabushiki Kaisha, Tokyo, Japan

[21] Appl. No.: 351,965

[22] Filed: May 15, 1989

[30] Foreign Application Priority Data

May 16, 1988 [JP] Japan ................. 63-118497

[51] Int. Cl.$^5$ .............................................. B06G 3/18
[52] U.S. Cl. ..................................... 280/690; 280/688
[58] Field of Search ............... 280/688, 689, 690, 701, 280/697; 180/358

[56] References Cited

U.S. PATENT DOCUMENTS

| | | | |
|---|---|---|---|
| 4,664,412 | 5/1987 | Matschinsky | 280/688 |
| 4,690,426 | 9/1987 | Kubo et al. | 280/690 |
| 4,717,171 | 1/1988 | Kami et al. | 280/688 |
| 4,725,073 | 2/1988 | Sano et al. | 280/690 |
| 4,754,992 | 7/1988 | Asanuma | 280/690 |
| 4,790,560 | 12/1988 | Asanuma et al. | 280/701 |
| 4,832,363 | 5/1989 | Mitobe | 280/690 |

FOREIGN PATENT DOCUMENTS

| | | |
|---|---|---|
| 59-96008 | 6/1984 | Japan . |
| 2130979 | 6/1984 | United Kingdom . |
| 2130980 | 6/1984 | United Kingdom . |

*Primary Examiner*—Richard A. Bertsch
*Attorney, Agent, or Firm*—Irving M. Weiner; Joseph P. Carrier; Pamela S. Burt

[57] ABSTRACT

A vehicular suspension includes a support member having upper and lower ends adapted to be coupled to a vehicle body, and upper arm having one end coupled to a substantially intermediate portion of the support member, a lower arm having one end coupled to a lower end of the support member, and a knuckle having upper and lower ends supported respectively on other ends of the upper and lower arms.

7 Claims, 1 Drawing Sheet

SUSPENSION FOR MOTOR VEHICLES

BACKGROUND OF THE INVENTION

1. Field of the Invention:

The present invention relates to a suspension for a motor vehicle such as an automobile.

2. Description of the Relevant Art:

One type of vehicular suspension, known as a double-wishbone suspension, having upper and lower arms connecting a wheel-supporting knuckle to a vehicle body is disclosed in Japanese Laid-Open Patent Publication No. 59-96008, for example.

In the disclosed suspension, the upper and lower arms are attached at ends thereof to the vehicle body and support on their other ends the upper and lower ends, respectively, of the knuckle. In order to disperse forces transmitted from the wheel to the vehicle body through the upper and lower arms, the upper and lower arms are spaced as large a distance from each other as possible between their ends connected to the vehicle body.

Therefore, the length of the knuckle that is supported by the other ends of the upper and lower arms is necessarily large, making the knuckle large in size. With the large knuckle employed, difficulty is experienced in establishing a proper location of the damper of the suspension, i.e., considerable limitations are imposed on the location of the damper, and the unsprung weight of the suspension is increased.

SUMMARY OF THE INVENTION

In view of the drawbacks of the known vehicular suspension, it is an object of the present invention to provide a suspension for motor vehicles which allows a damper to be located with less positional limitations, and has a reduced unsprung weight, and which properly disperses forces transmitted to a vehicle body on which the suspension is mounted.

To achieve the above object, a suspension for a motor vehicle according to the present invention includes a support member having upper and lower ends adapted to be coupled to a vehicle body, an upper arm having one end coupled to a substantially intermediate portion of the support member, a lower arm having one end coupled to a lower end of the support member, and a knuckle having upper and lower ends supported respectively on other ends of the upper and lower arms.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
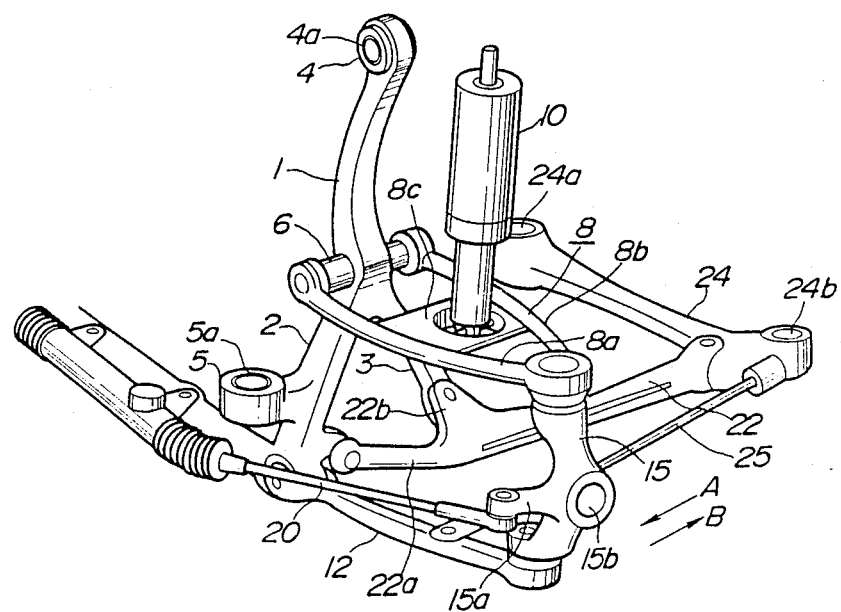
FIG. 1 is a perspective view of a suspension for a motor vehicle according to the present invention.
Figure 2:
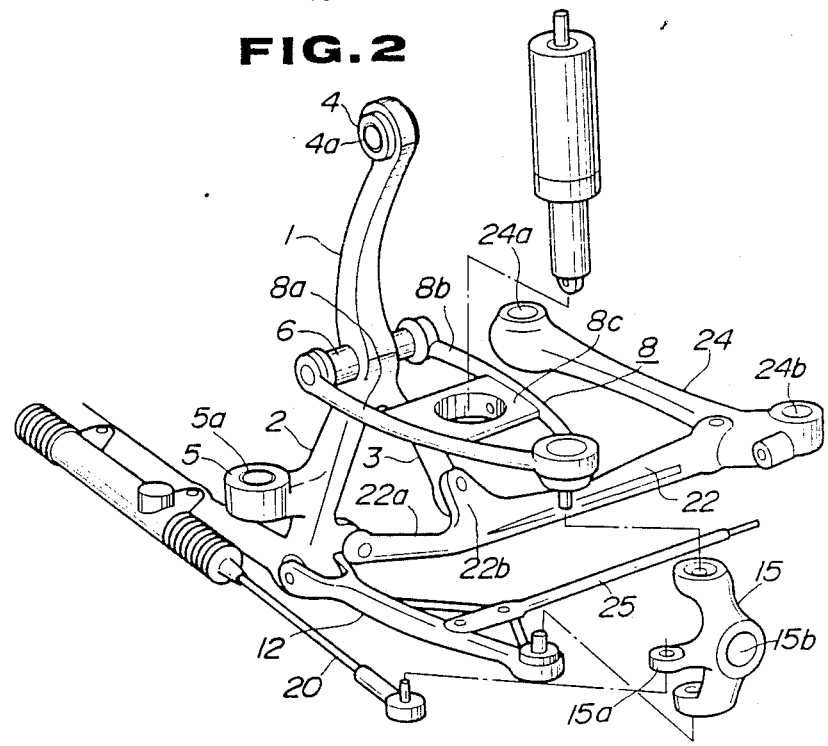
FIG. 2 is an exploded perspective view of the suspension shown in FIG. 1.

As shown in FIGS. 1 and 2, a suspension for a motor vehicle such as an automobile includes a support member 1 having a lower portion bifurcated into a pair of legs 2, 3. The upper end of the support member 1 and the leg 2 have respective mounts 4, 5 which are attached to a vehicle body (not shown) through bushings 4a, 5a, respectively. The bushings 4a, 5a allow the support member 1 to be displaceable over a certain interval or distance in the longitudinal directions of the motor vehicle (indicated by the arrows A, B) for achieving compliance steer.

A pivot shaft 6 is horizontally mounted on a substantially intermediate or central portion of the support member 1 where the legs 2, 3 join together. The suspension also includes an upper arm 8 having one end coupled to the pivot shaft 6. The upper arm 8 comprises two arm members 8a, 8b, and a support plate 8c extending between and joined to the arm members 8a, 8b, the arm members 8a, 8b being integrally joined to each other at the other end of the arm 8.

A damper 10 has a lower end attached to the support plate 8c and an upper end coupled to the vehicle body. However, the upper end of the damper 10 may be connected to the mount 4 on the upper end of the support member 1, and the upper end of the damper 10 and the mount 4 may be fastened together to the vehicle body.

The suspension further includes a lower arm 12 having one end pivotally coupled to the lower end of the leg 2. The other end of the lower ar 12 is pivotally joined to the lower end of a knuckle 15. The other end of the upper arm 8 is pivotally coupled to the upper end of the knuckle 15. The knuckle 15 is thus supported by the upper and lower arms 8, 12.

The knuckle 15 has a mount 15a on an intermediate portion thereof and also a through hole 15b defined in the intermediate portion. A tie rod 20 has one end connected to the mount 15a. A drive axle (not shown) extends through the hole 15b and is connected to a road wheel (not shown) which is rotatably supported by the knuckle 15.

A beam 22 has on its one end a pair of joint arms 22a, 22b bolted to the legs 2, 3, respectively, of the support member 1. The other end of the beam 22 is bolted to an engine supporting beam 24. The beam 24 has on its opposite ends mounts 24a, 24b installed on the vehicle body. The beam 24 and the lower arm 12 are interconnected by a radius rod 25.

The support member 1 is vertically long enough to sufficiently disperse forces transmitted from the upper and lower arms 8, 12 to the vehicle body. The length of the support member 1 may be sufficiently increased by attaching the mount 5 to the vehicle body substantially at the height of the center of the tire of the road wheel and also attaching the mount 4 to the vehicle body at a height above the tire.

Since one end of the upper arm 8 is attached to the intermediate portion of the support member 1, the distance between the upper and lower arms 8, 12 is reduced to reduce the vertical length of the knuckle 15. The size of the knuckle 15 is thus reduced to allow the damper 10 to be located with increased layout freedom or less positional limitations, and the unsprung weight of the suspension is reduced.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. A suspension for a motor vehicle having a vehicle body and a road wheel, comprising in combination:
   a movable support member having upper and lower ends adapted to be movably attached to the vehicle body;
   a knuckle having upper and lower ends adapted to support the road wheel;
   an upper arm having one end pivotally coupled to said support member and an opposite end coupled to said upper end of said knuckle; and
   a lower arm having one end pivotally coupled to said lower end of said support member and an opposite end coupled to said lower end of the knuckle.

2. A suspension according to claim 1, wherein said support member has a pair of legs at a lower portion thereof and said one end of the upper arm is pivotally coupled to said support member adjacent to a portion where said pair of legs join together.

3. A suspension according to claim 1, wherein said one end of the upper arm is coupled to a central portion of said support member.

4. A suspension according to claim 1, wherein said support member is adapted to be displaceable in longitudinal directions of the vehicle body.

5. A suspension for a motor vehicle having a vehicle body and a road wheel, comprising:
   carrier means for rotatably carrying a road wheel; and
   support means for swingably supporting said carrier means on a vehicle body;
   said support means including a movable support member adapted to be movably attached to a vehicle body and to extend substantially vertically of the vehicle body, and at least one arm member pivotally connected between said carrier means and said support member and adapted to extend substantially transversely of the vehicle body.

6. A suspension according to claim 5, wherein:
   said support means includes a first arm member having one end pivotally supported on a substantially central portion of said support member and an opposite end coupled to an upper end of said carrier means; and
   a second arm member having one end pivotally coupled to a lower end of said support member and an opposite end coupled to a lower end of said carrier means.

7. A suspension according to claim 5, wherein:
   said support member is adapted to be displaceable in longitudinal directions of the vehicle body.

* * * * *

UNITED STATES PATENT AND TRADEMARK OFFICE
CERTIFICATE OF CORRECTION

PATENT NO.  :  4,964,651
DATED       :  October 23, 1990
INVENTOR(S) :  Kanji Kubo It is certified that error appears in the above-identified patent and that said Letters Patent is hereby corrected as shown below:

In The Abstract, line 3, change "and" to --an--.

Column 2, line 22, change "ar" to --arm--.

Signed and Sealed this

Fourth Day of February, 1992

Attest:

HARRY F. MANBECK, JR.

*Attesting Officer*       *Commissioner of Patents and Trademarks*